(12) United States Patent  
Edmunds

(10) Patent No.: US 8,269,889 B2
(45) Date of Patent: Sep. 18, 2012

(54) TELEVISION APPARATUS

(75) Inventor: Timothy Edmunds, Mid Glamorgan (GB)

(73) Assignee: Sony United Kingdom Limited, Weybridge (GB)

( * ) Notice: Subject to any disclaimer, the term of this patent is extended or adjusted under 35 U.S.C. 154(b) by 364 days.

(21) Appl. No.: 12/619,154

(22) Filed: Nov. 16, 2009

(65) Prior Publication Data

US 2010/0182502 A1 Jul. 22, 2010

(51) Int. Cl.
*H04N 7/00* (2006.01)

(52) U.S. Cl. .......................... 348/468; 348/462; 348/465

(58) Field of Classification Search ................... 348/468, 348/460, 462, 465, 738; 340/407.1, 407.2; H04N 7/00, 11/00, 5/60
See application file for complete search history.

(56) References Cited

U.S. PATENT DOCUMENTS

| 2002/0047946 | A1 | 4/2002 | Yuen et al. |
| 2003/0105639 | A1 | 6/2003 | Naimpally |
| 2009/0167509 | A1* | 7/2009 | Fadell et al. ............... 340/407.2 |

FOREIGN PATENT DOCUMENTS

| EP | 1 363 455 A2 | 11/2003 |
| EP | 1 363 455 A3 | 11/2003 |
| EP | 1 686 796 A1 | 8/2006 |
| GB | 2 405 018 A | 2/2005 |
| JP | 2004-254006 | 9/2004 |
| JP | 2007-288309 | 11/2007 |

* cited by examiner

*Primary Examiner* — Sherrie Hsia
(74) *Attorney, Agent, or Firm* — Oblon, Spivak, McClelland, Maier & Neustadt, L.L.P.

(57) ABSTRACT

A television apparatus (20) including a display (22) and an audio transducer (24,28) for reproducing video and audio component parts of a television signal. A processor (40) is provided for separating from the television signal an audio descriptor component part for providing an audio description of a corresponding video component part of the television signal. A controller (46) selectively controls the television apparatus to operate in one of an audio descriptor mode in which an audio descriptor component part is reproduced by the audio transducer (24,28) at the same time as the display (22) reproduces the respective corresponding video component part and a standard mode in which the audio descriptor component part is not reproduced. A user operable interface (30,50,48) is provided for selectively selecting between the standard mode and the audio descriptor mode. The controller (46) is configured to drive the display (42) to provide a mode image (52) providing an indication of the selective mode. It is additionally configured to cause the television apparatus to provide, for a visually impaired user, an additional indication whenever the audio descriptor mode is selected and an additional indication whenever the audio descriptor mode is deselected.

13 Claims, 4 Drawing Sheets

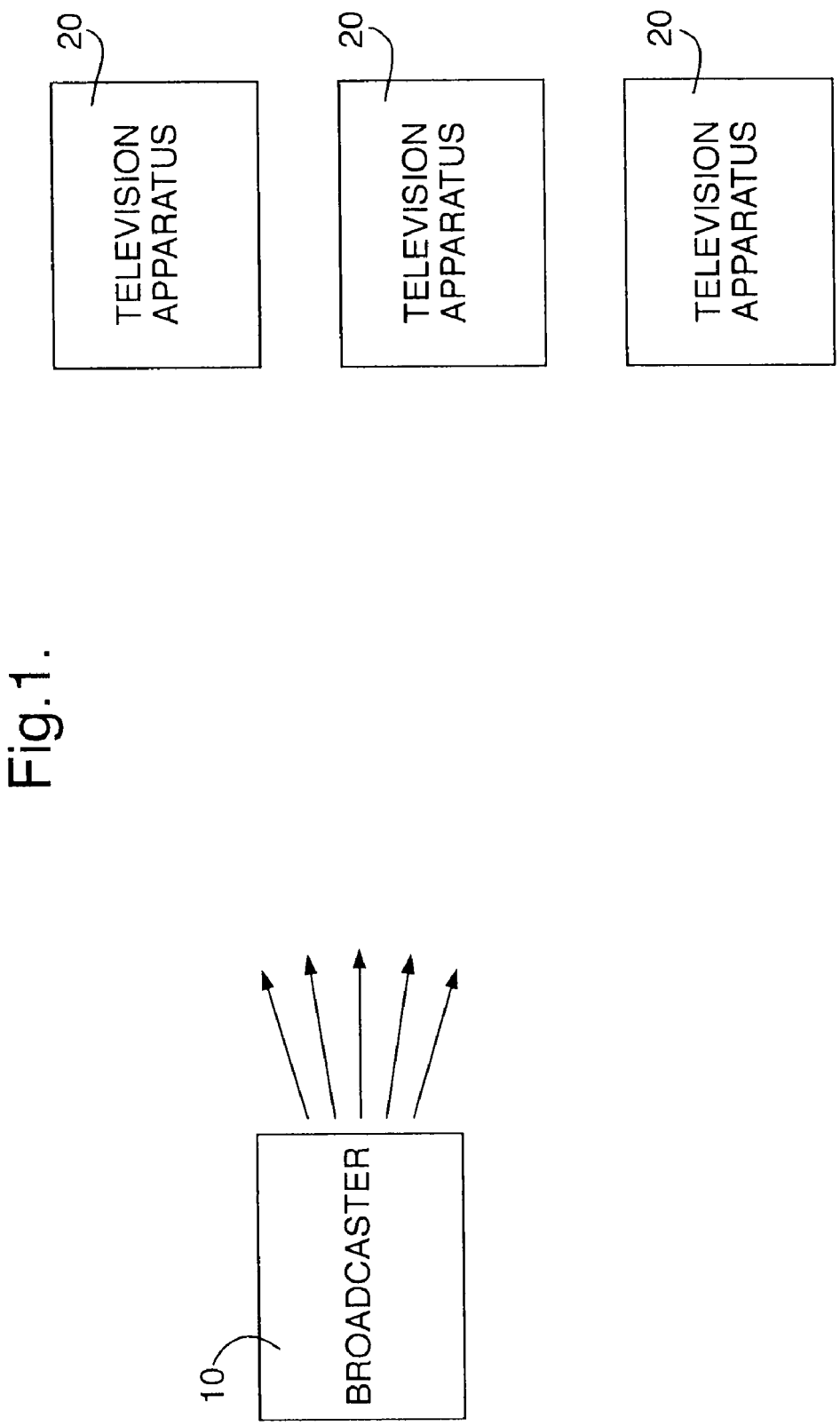

TELEVISION APPARATUS

CROSS-REFERENCE TO RELATED APPLICATIONS

This application is based upon and claims the benefit of priority from European Application No. 09250132.9 filed 19 Jan. 2009, the entire contents of which are incorporated by reference.

BACKGROUND OF THE INVENTION

1. Field of the Invention

The present invention relates to a television apparatus and also a method of controlling a television apparatus, in particular in relation to providing indications to visually impaired users when audio descriptor modes are selected.

2. Description of the Related Art

It is well known in the prior art to provide, in television broadcast streams, additional audio descriptor component parts which provide audio description of corresponding video component parts in a broadcast stream.

In some environments, a television signal, whether broadcast or not, may be provided with a number of different audio channels, for instance representing a number of different languages, as well as the audio descriptor part.

With such an arrangement, a user will scroll through the various audio channels and may be provided with a mode image on the television display providing an indication of the selected mode, for instance specifying "English", "Spanish", "Audio Description".

OBJECTS AND SUMMARY OF THE INVENTION

The present invention is based at least partly on a recognition that it may be difficult for a visually impaired user to determine, or at least not immediately apparent to that user, whether the audio descriptor mode has been selected. It is an object of the present invention to at least reduce such a problem.

According to the present invention, there is provided a method of controlling a television apparatus including a display and an audio transducer for reproducing video and audio component parts of a television signal and a processor for separating from the television signal an audio descriptor component part for providing an audio description of a corresponding video component part of the television signal. The method includes selectively controlling the television apparatus to operate in one of an audio descriptor mode in which an audio descriptor component part is reproduced by the audio transducer at the same time as the display reproduces the respective corresponding video component part and a standard mode in which the audio descriptor component part is not reproduced. It also includes enabling user selection of either the standard mode or the audio descriptor mode, driving the display to provide a mode image providing an indication of the selected mode and causing the television apparatus to provide, for a visually impaired user, an additional indication whenever the audio descriptor mode is selected.

According to the present invention, there is also provided a television apparatus including a display and an audio transducer for reproducing video and audio component parts of a television signal, a processor for separating from the television signal an audio descriptor component part for providing an audio description of a corresponding video component part of the television signal, a controller for selectively controlling the television apparatus to operate in one of an audio descriptor mode in which an audio descriptor component part is reproduced by the audio transducer at the same time as the display reproduces the respective corresponding video component part and a standard mode in which the audio descriptor component part is not reproduced and a user operable interface for selectively selecting between the standard mode and the audio descriptor mode. The controller is configured to drive the display to provide a mode image providing an indication of the selective mode. The controller is additionally configured to cause the television apparatus to provide, for a visually impaired user, an additional indication whenever the audio descriptor mode is selected.

In this way, a user is provided with the normal, probably relatively discreet, display which indicates the selected mode. Only when the audio descriptor mode is selected (that mode being intended for use by a visually impaired user), is an additional indication provided for a visually impaired user.

Of course, it would be possible merely to change the normal manner of indicating the selected mode to something which would be recognised by a visually impaired user. However, this form of indication would likely be found unnecessary and possibly annoying to a non-visually impaired user. The present invention allows a non-visually impaired user to use the television apparatus in a relatively normal manner, but allows an additional indication to be given for a visually impaired user.

The television apparatus may additionally provide an additional indication for a visually impaired user whenever the audio descriptor mode is deselected.

Thus, with similar advantages, a visually impaired user is provided with a clear indication that he or she has navigated away from the audio descriptor mode.

It is possible for the additional indication given by the television apparatus to be identical whenever the audio descriptor mode is selected or deselected. However, preferably, the additional indication which is given whenever the audio descriptor mode is selected is different to the additional indication which is given whenever the audio descriptor mode is deselected.

The controller may be configured to drive the audio transducer to produce, as the additional indication, an audible indication. Hence, the audible indication may indicate that the audio descriptor mode has been selected or has been deselected.

This is particularly advantageous for visually impaired users since no visual capability is required at all.

The audible indication may be a predetermined tone. This may have a particular pitch, tonal or other quality. Where the audible indication for selection and deselection of the audio descriptor mode are different, different tones may be used.

The audible indication may be a spoken message, for instance a recorded message or a synthesised message. Different messages may be given for the audible indication indicating that the audio descriptor mode has been selected and the audible indication indicating that the audio descriptor mode has been deselected.

It is also possible for the user-operable interface to include a tactile feedback generator, for instance for producing vibrations, for example in a remote control handset. The controller may be configured to drive the tactile feedback generator to produce, as the additional indication, a signal which can be felt by the touch of the user, for instance a vibration. This can be used to indicate that the audio descriptor mode has been selected or that the audio descriptor mode has been deselected. Different signals can be used for selection or deselection.

This arrangement is also highly advantageous to visually impaired users, because no visual ability is required.

The controller may be configured to drive the display to display, as the additional indication, one or more of a bright image, a coloured image, a flashing image and an image larger than said mode image.

In this way, a visually impaired user who has some visual ability is able to determine that the audio descriptor mode has been selected or deselected by means of the display.

Preferably, the additional indication is provided on the display for only a short predetermined time.

It will be appreciated that the invention can also be embodied in software for use in an appropriate device such as a computer or television apparatus.

BRIEF DESCRIPTION OF THE DRAWINGS

FIG. 1 illustrates a broadcast environment in which the present invention may be embodied;

DETAILED DESCRIPTION OF THE PREFERRED EMBODIMENTS

The invention will be more clearly understood from the following description, given by way of example only, with reference to the accompanying drawings.

The present invention has particular advantageous applicability to a television apparatus operable selectively either in a normal or in an audio descriptor mode and either receiving streamed data in a broadcast environment or from a prerecorded source, such as a disk, for instance a DVD or Blu-Ray disc.

FIG. 1 illustrates a broadcast environment where a broadcaster (10) broadcasts television signals to a plurality of receiving television apparatuses (20). The television signals broadcast by the broadcaster (10) include audio data and video data corresponding to audio/video sequences of television programmes. They may also include other video data, such as data representing graphical images, for instance for an electronic programme guide (EPG).

The broadcaster (10) may include, in the television signals, additional data, such as additional audio data corresponding to different respective languages and also supplementary audio data for providing audio description of images contained in the video signal. It is known to provide such supplementary audio data for providing an audio description of scenes occurring within a video sequence. Appropriate audio description can also be provided for graphical images, such as electronic programme guides.

Similarly streams of data containing alternative audio data and additional audio information for the assistance of visually impaired users can be provided from other sources, such as recording media (for example disks) or the interne (for example IPTV).

Figure 2A:
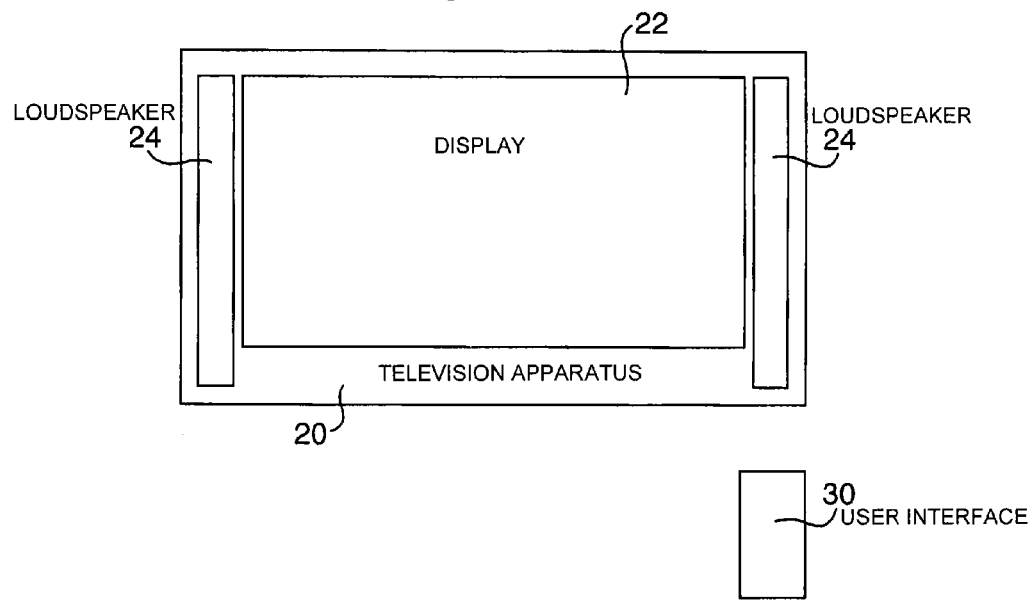
FIGS. 2(a) and (b) illustrate examples of a television apparatus embodying the present invention.
Figure 2B:
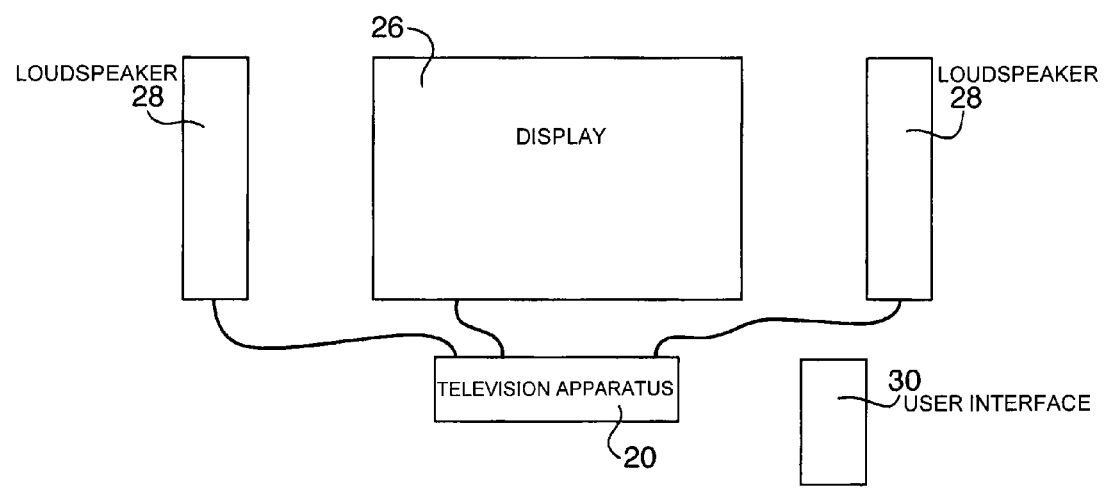

FIGS. 2(a) and (b) illustrate different respective television apparatuses (20) which could embody the present invention. In the arrangement of FIG. 2(a), the television apparatus (20) itself includes a display (22) and a pair of loudspeakers (24) acting as audio transducers. In the example of FIG. 2(b), the television apparatus (20) takes the form of a set top box which can be connected to a separate display (26) and separate loudspeakers (28) acting as audio transducers.

In both examples, the television apparatus (20) is provided with a user interface (30), for instance, as illustrated, in the form of a remote control device.

Figure 3:
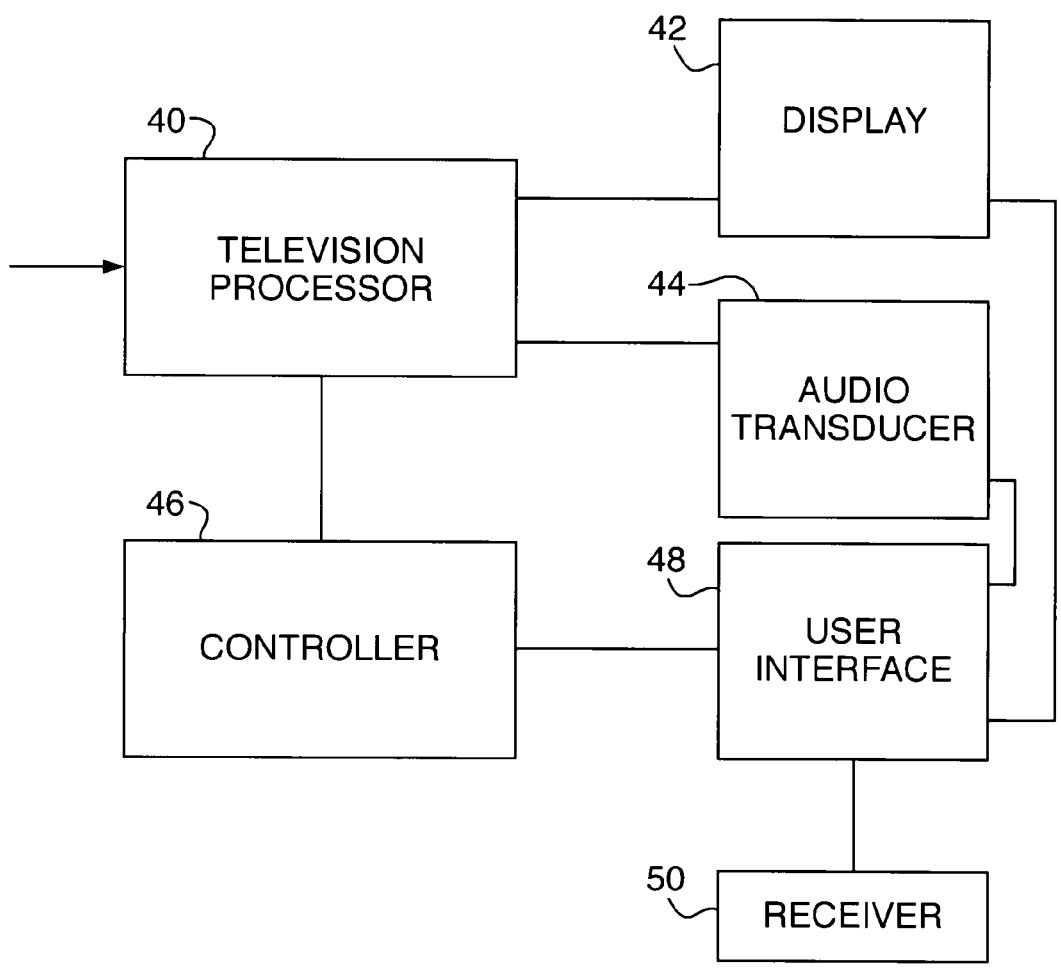
FIG. 3 illustrates schematically internal component parts of a television apparatus embodying the present invention.

FIG. 3 illustrates schematically a television apparatus embodying the present invention.

A data stream containing video, audio and other packets of data can be received by a television processor (40) and converted into appropriate signals for reproduction by a display (42) and audio transducers (44) under the control of controller (46). In particular, the television processor (40) may be embodied in any known convention and manner to identify, separate and decode packets of data for a particular television programme to be viewed by a user. As illustrated, the controller (46) communicates with a graphical user interface (GUI) (48) which might for instance receive inputs by way of a remote control signal receiver (50) receiving remote control signals from an external remote controller (30).

Thus, in any known manner, a user may control the television apparatus (30) to reproduce, from the received data stream, any desired television programme. A similar arrangement is equally applicable to a data stream received by the internet or from a recording medium such as a disk. Some DVDs and Blu-Ray discs are encoded with audio descriptor audio streams. Audio streams may be identified by specific codes normally representing the language of the audio stream. Specific codes may be assigned to audio descriptor streams of the discs.

Where the data stream includes alternative audio tracks, for instance for different respective languages, the controller (46) can control the television processor (40) to separate appropriate packets from the stream and to provide appropriate signals for the required audio tracks to the audio transducer (44). Similarly, additional audio information intended to assist visually impaired users can also be identified in the data stream. This forms an audio descriptor component part of the data stream. The television processor (40) separates the respective data packets of that component part and provides it as a corresponding signal to the audio transducer (44). The graphical user interface (48) can be arranged to provide on the display (42) an indication of the current audio track selected for reproduction, for instance by way of reference to the respective language.

A transport stream for a multiplex of services may include a number of programs. "Programs" is used here in the MPEG sense and corresponds to the term "Service" in the DVB sense. One or more audio streams, video streams and data streams may constitute each program. In for example DVB transport streams, the Program Mapping Table will identify an audio stream corresponding to a program by identifying packets of the audio stream with common Audio PIDs (Program Identifiers). Audio-type data is also carried for an audio stream as defined by ISO 639 Language Descriptor. Audio-type 0×03 identifies visually impaired commentary.

Data with a common PID and 0×03 Audio type can be separated from the transport stream. Other methods of identifying and separating packets corresponding to Audio Description streams (packets) are possible depending on how the audio streams are carried in the transport stream. Such methods may involve interpreting accompanying signalling data for the audio streams.

Figure 4A:
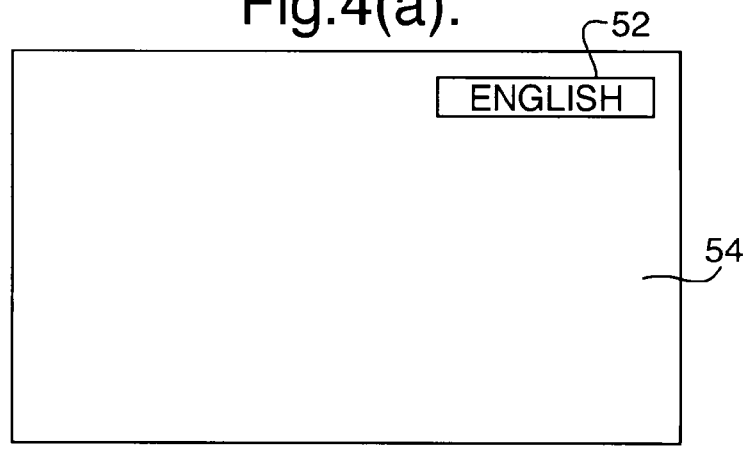
FIGS. 4(a) to (c) illustrate schematically the display of mode images to be used in conjunction with an embodiment of the present invention.
Figure 4B:
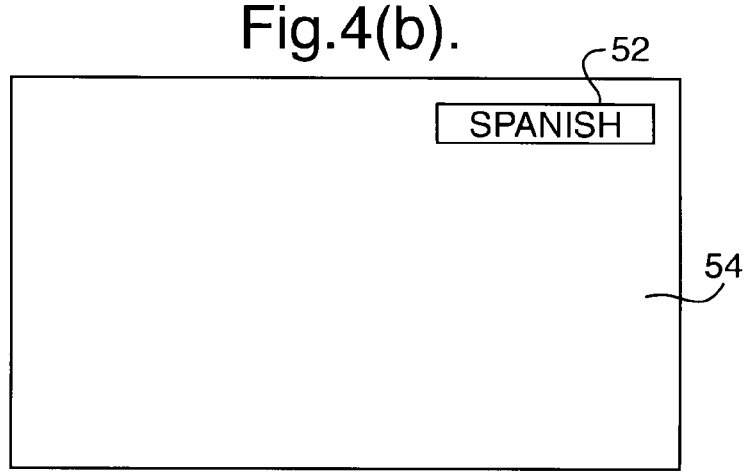

FIG. 4(a) illustrates an example of how the graphical user interface (48) could indicate at a portion (52) of an image (54) to be displayed by the display (42) the language of the audio track currently selected. By means of a remote control (30) or any other input device, the user is able to select other available languages, for instance scrolling continuously through the selection of available languages. Thus, scrolling from English to Spanish, the displayed image might change as illustrated in FIGS. 4(a) and (b).

Figure 4C:
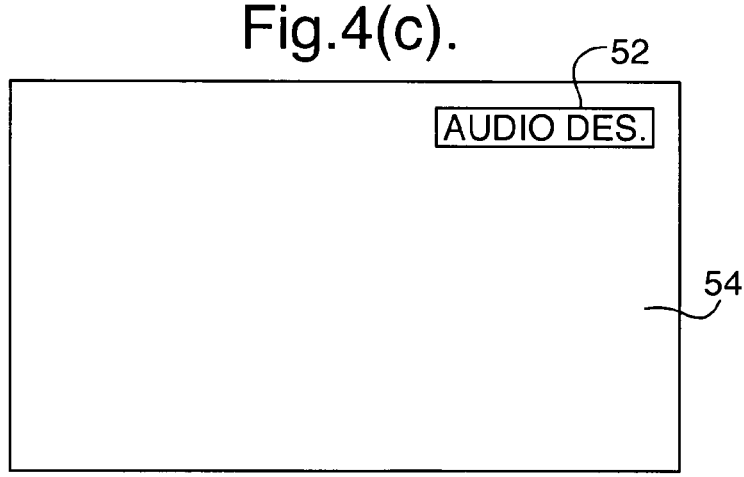

It is possible to scroll further to an additional audio functionality, for instance audio descriptor as illustrated in FIG. 4(c). However, of course, it may be difficult for a user who is visually impaired to realise that this mode has been selected.

It is now proposed that when a user selects audio data which is intended for use by a visually impaired user, the television apparatus, by means of the controller (46) and graphic user interface (48), provides an additional indication to the user that audio data of that type has been selected.

The manner of the indication can take one or more of many forms suitable for providing appropriate indication to visually impaired users. Thus, it could be sufficient for the television apparatus to be configured to display momentarily an image on the display (42) which would be recognised by a partially sighted user. The image could be one or more of bright, colourful or flashing. It could include text, for instance, identifying the selected mode, with very large and bold font.

In preferred embodiments, so that the television apparatus is beneficial also to users with little or no sight, the indication is provided in a non-visual manner. The input unit used by the user (for example the remote control unit (30) could be fitted with a vibration device which is caused to operate and, hence, provide vibrations indicating that a mode intended for a visually impaired user has been selected. In a preferred embodiment, when a mode for a visually impaired user has been selected, the user interface (48) causes the audio transducer (44) to produce an audible indication of that selection. In particular, it may produce a tone or beep which the user can recognise as indicating such a selection. It is also possible for the audible indication to be a spoken phrase, for instance stating 'you have selected audio description'. This may be by invoking playback of a stored audio file, for instance of MP3 format.

Of course, one or more of the indications described above could be provided together.

In this way, when a user toggles through different possible modes, when a mode intended for a visually impaired user is selected, an alternative indication, preferably non-visual and more preferably audible, is provided. This can be applied to an arrangement such as described above where a user merely moves from one selection to another, but it is also applicable to any other selection process carried out on a visual user interface. The user navigates through the system and a visual indication of that navigation may be given for all possible selections, with an additional indication, intended for a visually impaired user, given only for those selections intended for a visually impaired user.

In a preferred embodiment, it is also desirable for an indication to be given when a user has navigated away from a mode intended for a visually impaired user or merely selected a different mode (not intended for a visually impaired user) after selection of a mode intended for a visually impaired user. The indication can be provided in one or more of the manners described above. However, the actual indication is preferably different so as to provide a clear indication to the user that navigation away from a mode intended for a visually impaired user has occurred. Thus, for instance, a different type of vibration may be provided, a different type of tone or beep may be provided or indeed, an alternative spoken message may be provided.

We claim:

1. A television apparatus comprising:
a display and an audio transducer to reproduce video and audio component parts of a television signal;
a processor to separate from the television signal an audio descriptor component part for providing an audio description of a corresponding video component part of the television signal;
a controller to selectively control the television apparatus to operate in one of an audio descriptor mode in which an audio descriptor component part is reproduced by the audio transducer at the same time as the display reproduces the respective corresponding video component part and a standard mode in which the audio descriptor component part is not reproduced; and
a user operable interface to select between the standard mode and the audio descriptor mode,
wherein the controller is configured to drive the display to provide a mode image providing an indication of the selective mode, and
the controller is additionally configured to cause the television apparatus to provide, for a visually impaired user, an additional indication, different from the audio descriptor component part, whenever the audio descriptor mode is selected.

2. A television apparatus according to claim 1 wherein the controller is configured to drive the audio transducer to produce, as the additional indication, an audible indication.

3. A television apparatus according to claim 2 wherein the audible indication is a predetermined tone.

4. A television apparatus according to claim 2 wherein the audible indication is a spoken message.

5. A television apparatus according to claim 1 wherein the user operable interface includes a vibration device configured to provide vibrations and the controller is configured to drive the vibration device to produce, as the additional indication, vibrations at the user operable interface.

6. A television apparatus according to claim 5 wherein the controller is configured to drive the audio transducer to produce, as the additional indication, an audible indication.

7. A television apparatus according to claim 1 wherein the controller is configured to drive the display to display, as the additional indication, one or more of a bright image, a coloured image, a flashing image and an image larger than said mode image.

8. A television apparatus according to claim 7 wherein the controller is configured to drive the audio transducer to produce, as the additional indication, an audible indication.

9. A television apparatus comprising:
a display and an audio transducer to reproduce video and audio component parts of a television signal;
a processor to separate from the television signal an audio descriptor component part for providing an audio description of a corresponding video component part of the television signal;
a controller to selectively control the television apparatus to operate in one of an audio descriptor mode in which an audio descriptor component part is reproduced by the audio transducer at the same time as the display reproduces the respective corresponding video component part and a standard mode in which the audio descriptor component part is not reproduced; and
a user operable interface to select between the standard mode and the audio descriptor mode,
wherein the controller is configured to drive the display to provide a mode image providing an indication of the selective mode, the controller is additionally configured to cause the television apparatus to provide, for a visually impaired user, an additional indication whenever the audio descriptor mode is selected, and the controller is additionally configured to cause the television apparatus additionally to provide, for a visually impaired user, an additional indication whenever the audio descriptor mode is deselected.

10. A television apparatus according to claim 9 wherein the additional indication whenever the audio descriptor mode is selected is different to the additional information whenever the audio descriptor mode is deselected.

11. A method of controlling a television apparatus including a display and an audio transducer for reproducing video and audio component parts of a television signal and a processor for separating from the television signal an audio descriptor component part for providing an audio description of a corresponding video component part of the television signal, the method comprising:
- selectively controlling the television apparatus to operate in one of an audio descriptor mode in which an audio descriptor component part is reproduced by the audio transducer at the same time as the display reproduces the respective corresponding video component part and a standard mode in which the audio descriptor component part is not reproduced;
- enabling user selection of either the standard mode or the audio descriptor mode;
- driving the display to provide a mode image providing an indication of the selected mode; and
- causing the television apparatus to provide, for a visually impaired user, an additional indication, different from the audio descriptor component part, whenever the audio descriptor mode is selected.

12. A method of controlling a television apparatus including a display and an audio transducer for reproducing video and audio component parts of a television signal and a processor for separating from the television signal an audio descriptor component part for providing an audio description of a corresponding video component part of the television signal, the method comprising:
- selectively controlling the television apparatus to operate in one of an audio descriptor mode in which an audio descriptor component part is reproduced by the audio transducer at the same time as the display reproduces the respective corresponding video component part and a standard mode in which the audio descriptor component part is not reproduced;
- enabling user selection of either the standard mode or the audio descriptor mode;
- driving the display to provide a mode image providing an indication of the selected mode;
- causing the television apparatus to provide, for a visually impaired user, an additional indication, different from the audio descriptor component part, whenever the audio descriptor mode is selected; and
- causing the television apparatus additionally to provide, for a visually impaired user, an additional indication whenever the audio descriptor mode is deselected.

13. A non-transitory computer-readable medium encoded with computer-readable instructions thereon, the computer-readable instructions when executed by a processor cause the processor to perform a method of controlling a television apparatus including a display and an audio transducer for reproducing video and audio component parts of a television signal and a processor for separating from the television signal an audio descriptor component part for providing an audio description of a corresponding video component part of the television signal, the method comprising:
- selectively controlling the television apparatus to operate in one of an audio descriptor mode in which an audio descriptor component part is reproduced by the audio transducer at the same time as the display reproduces the respective corresponding video component part and a standard mode in which the audio descriptor component part is not reproduced;
- enabling user selection of either the standard mode or the audio descriptor mode;
- driving the display to provide a mode image providing an indication of the selected mode; and
- causing the television apparatus to provide, for a visually impaired user, an additional indication, different from the audio descriptor component part, whenever the audio descriptor mode is selected.

* * * * *